United States Patent
Cho et al.

(10) Patent No.: US 9,976,781 B2
(45) Date of Patent: May 22, 2018

(54) AIR-CONDITIONING AND HEATING SYSTEM FOR PASSENGER BOARDING BRIDGE AND CONTROL SYSTEM THEREFOR

(71) Applicant: KOREA AIRPORTS CORPORATION, Seoul (KR)

(72) Inventors: Hee Hyeong Cho, Seongnam-si (KR); Dong Soo Kim, Gimpso-si (KR); Won Lae Lim, Paju-si (KR); Sang Ju Roh, Jeju-si (KR)

(73) Assignee: KOREA AIRPORTS CORPORATION, Seoul (KR)

( * ) Notice: Subject to any disclaimer, the term of this patent is extended or adjusted under 35 U.S.C. 154(b) by 686 days.

(21) Appl. No.: 14/394,862

(22) PCT Filed: Dec. 20, 2012

(86) PCT No.: PCT/KR2012/011120
§ 371 (c)(1),
(2) Date: Oct. 16, 2014

(87) PCT Pub. No.: WO2013/162151
PCT Pub. Date: Oct. 31, 2013

(65) Prior Publication Data
US 2015/0330672 A1 Nov. 19, 2015

(30) Foreign Application Priority Data
Apr. 23, 2012 (KR) .................. 10-2012-0042281

(51) Int. Cl.
*E01D 1/00* (2006.01)
*F25D 17/06* (2006.01)
(Continued)

(52) U.S. Cl.
CPC ............ *F25B 13/00* (2013.01); *B64F 1/3055* (2013.01); *E01D 6/00* (2013.01); *E01D 15/04* (2013.01)

(58) Field of Classification Search
CPC ......... B64F 1/3055; E01D 15/04; E01D 6/00; F25B 13/00
(Continued)

(56) References Cited

U.S. PATENT DOCUMENTS

| | | | | |
|---|---|---|---|---|
| 3,599,262 A | * | 8/1971 | Carder | B65G 69/24 |
| | | | | 14/71.5 |
| 3,644,952 A | * | 2/1972 | Hatch | B64F 1/305 |
| | | | | 135/115 |

(Continued)

FOREIGN PATENT DOCUMENTS

| | | |
|---|---|---|
| CN | 101318559 | 12/2008 |
| CN | 101903247 | 12/2010 |

(Continued)

OTHER PUBLICATIONS

International Search Report—PCT/KR2012/011120 dated Mar. 28, 2013.
(Continued)

*Primary Examiner* — Henry Crenshaw
(74) *Attorney, Agent, or Firm* — Cantor Colburn LLP

(57) ABSTRACT

A tunnel air-conditioning and heating apparatus is provided. the tunnel air-conditioning and heating apparatus may include a condenser provided at a rotunda; a compressor provided at the rotunda and connected to the condenser; an evaporator provided at a movable tunnel and connected to each of the condenser and the compressor; and a condenser connection pipe configured to connect the condenser with
(Continued)

the evaporator and a compressor connection pipe configured to the compressor with the evaporator each of which is formed into a flexible coil.

21 Claims, 10 Drawing Sheets

(51) Int. Cl.
*F25B 49/00* (2006.01)
*F25B 13/00* (2006.01)
*E01D 6/00* (2006.01)
*E01D 15/04* (2006.01)
*B64F 1/305* (2006.01)

(58) Field of Classification Search
USPC ............... 14/71.1, 71.5; 62/92, 132, 419
See application file for complete search history.

(56) References Cited

U.S. PATENT DOCUMENTS

| | | | | |
|---|---|---|---|---|
| 3,693,204 | A * | 9/1972 | Eggert, Jr. ............. | B64F 1/305 135/161 |
| 3,808,626 | A * | 5/1974 | Magill ................. | B64F 1/3055 14/71.5 |
| 3,950,963 | A * | 4/1976 | Sutherland ........... | F25D 31/003 165/74 |
| 3,988,900 | A * | 11/1976 | Kamata ..................... | F24F 1/00 454/236 |
| 4,459,813 | A * | 7/1984 | Petta ..................... | F25D 23/006 165/67 |
| 4,620,339 | A | 11/1986 | Shepheard | |
| 5,084,936 | A * | 2/1992 | Thomas, Jr. ........... | B64F 1/305 14/71.5 |
| 5,226,204 | A * | 7/1993 | Schoenberger ....... | B64F 1/3055 14/71.5 |
| 5,704,086 | A * | 1/1998 | Hansen ................. | B64F 1/3055 14/69.5 |
| 5,715,701 | A * | 2/1998 | Kreymer ................. | B64F 1/362 454/119 |
| 8,302,236 | B2 | 11/2012 | Kim et al. | |
| 2003/0050746 | A1 * | 3/2003 | Baiada ................. | G08G 5/0043 701/3 |
| 2004/0210419 | A1 * | 10/2004 | Wiebe .................. | F25B 49/005 702/182 |
| 2007/0045429 | A1 * | 3/2007 | Chapman, Jr. ....... | F24F 11/0012 236/46 C |
| 2010/0269272 | A1 * | 10/2010 | Kim ....................... | B64F 1/305 14/71.1 |

FOREIGN PATENT DOCUMENTS

| | | |
|---|---|---|
| EP | 2327630 | 6/2011 |
| JP | 07156896 | 6/1995 |
| JP | 2004276870 | 10/2004 |
| KR | 1020080021407 | 3/2008 |
| KR | 1020090067770 | 6/2009 |
| WO | 2009086025 | 7/2009 |

OTHER PUBLICATIONS

European Search Report—European Application No. 12874931.4 dated Nov. 6, 2015, citing EP 2 327 630, JP 2004 276870 and WO 2009/086025.

Zhou et al., HVAC design of the new terminal building in the Capital International Airport, Journal of HV & AC, 2001, pp. 68-71.

* cited by examiner

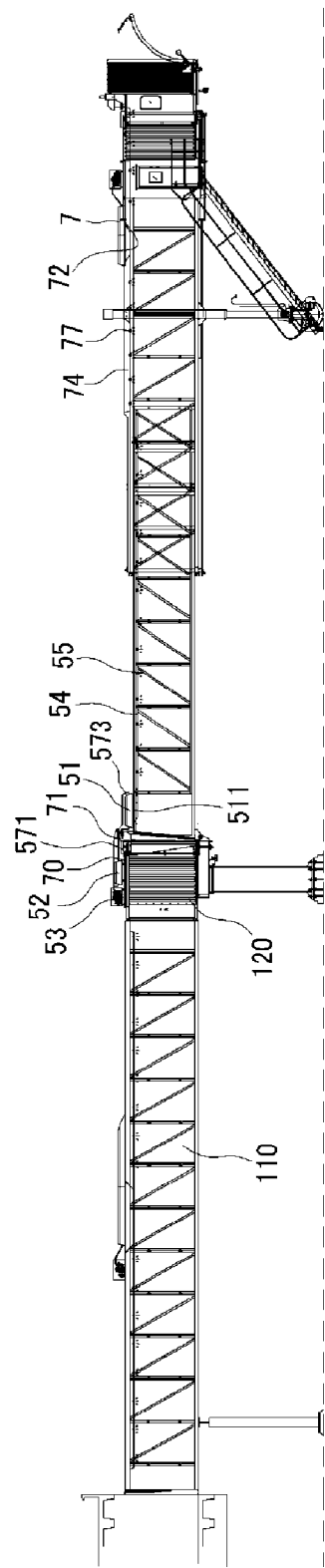

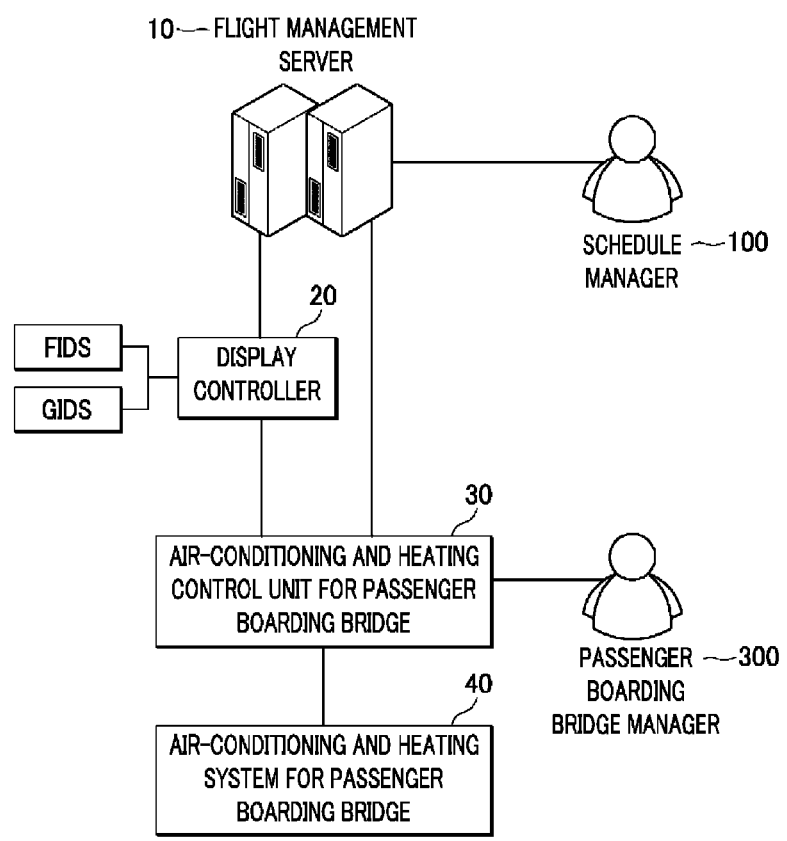

FIG. 8

INTERNATIONAL DEPARTURES

09:25

| AIRLINES | FLIGHTS | SCHEDULED TIME | DESTINATION | ESTIMATED TIME | GATE | REMARKS | |
|---|---|---|---|---|---|---|---|
| CCA | CA1123 | 09:30 | SHANGHAI | 09:30 | 1 | Procedure | ● |
| DLH | LH2233 | 09:40 | MUNICH | 09:40 | 2 | Procedure | ● |
| AFL | SU1039 | 09:45 | MOSKVA | 09:45 | 2 | Boarding | |
| KAL | KE763 | 10:05 | HANEDA | 10:05 | 3 | Boarding | |
| UAL | UA1045 | 10:25 | NEWYORK | -:- | 4 | Cancellation | |
| JAL | JL5226 | 10:30 | KANSAI | -:- | 2 | Cancellation | |
| AAR | OZ272 | 10:50 | BEIJING | 11:20 | 2 | Delay | |
| BAW | BA1123 | 11:10 | LONDON | 11:55 | 3 | Delay | |

AIR-CONDITIONING AND HEATING SYSTEM FOR PASSENGER BOARDING BRIDGE AND CONTROL SYSTEM THEREFOR

TECHNICAL FIELD

The present disclosure relates to a tunnel air-conditioning and heating apparatus applicable to a tunnel of a passenger boarding bridge, an air-conditioning and heating system for a passenger boarding bridge including the same, a passenger boarding bridge, and an air-conditioning and heating control system for a passenger boarding bridge.

BACKGROUND

A passenger boarding bridge is a bridge in the form of a machine for transferring passengers between an airplane and an airport terminal. Typically, the passenger boarding bridge includes a fixed tunnel installed from the terminal to a rotunda and a movable passenger boarding bridge installed between the rotunda and the airplane, and can change a direction and move to be adjacent to an air bridge by using wheels of the movable passenger boarding bridge. Typically, the passenger boarding bridge is formed of an inner tunnel and an outer tunnel. By moving the outer tunnel to accommodate the inner tunnel therein, a length of the movable passenger boarding bridge can be regulated.

The airport terminal and the airplane run adequate air-conditioning and heating. However, a wall of the passenger boarding bridge is manufactured from glass in most cases, and outside air flows through a rotunda area, above a cabin, and through gaps between the inner tunnel and the outer tunnel of the movable passenger boarding bridge, and, thus, a temperature in the passenger boarding bridge is higher or lower than an adequate temperature, which provokes complaints from passengers. In order to solve such problems of inconvenience, various air-conditioning and heating systems have been installed at the passenger boarding bridge.

For example, one of conventional air-conditioning and heating apparatuses for a passenger boarding bridge is installed at a fixed tunnel without limitation in installation position. Such an air-conditioning and heating apparatus for a passenger boarding bridge employs a packaged air-conditioning and heating apparatus for a general building with a low flow rate, which makes air feel cool or warm just under a place where an indoor unit is installed but cannot evenly air-condition and heat the inside of the tunnel even if the air-conditioning and heating apparatus is operated all day long.

Further, as for an air-conditioning and heating apparatus for a passenger boarding bridge installed at an upper part of the outer tunnel on the airplane side, when the passenger boarding bridge is minimized, a diffuser installed inside the outer tunnel is covered with the inner tunnel and air cannot be introduced into the outer tunnel.

Another conventional air-conditioning and heating apparatus for a passenger boarding bridge is as described in Korean Patent Laid-open Publication No. 10-006770 (Jun. 25, 2009) in which an air-conditioning and heating apparatus is installed at an upper part of the outer tunnel on the airplane side and an air-conditioning apparatus is installed at the inner tunnel on the rotunda side. To be specific, such an air-conditioning and heating apparatus for a passenger boarding bridge is installed at an upper part of a rotunda, and, thus, cooled and heated air can be transferred to the inside of an inner tunnel through a duct and a diffuser configured to transfer cooled and heated air to the inside of the inner tunnel, and at the end on the outer tunnel side of the diffuser provided within the inner tunnel, the diffuser is provided in a direction toward an outer tunnel, and, thus, cooled and heated air is supplied into the outer tunnel. Such an air-conditioning and heating apparatus for a passenger boarding bridge cannot transfer sufficient cooled and heated air to the outer tunnel since the duct can be installed only at the inside of the inner tunnel.

Further the movable passenger boarding bridge is transversely and vertically rotated around the rotunda. However, such an air-conditioning and heating apparatus is very limited in supplying cooled and heated air since a pipe connecting the air-conditioning and heating apparatus at the rotunda and the duct at the inner tunnel may be damaged as the movable passenger boarding bridge is rotated.

Furthermore, the outer tunnel may be moved toward the inner tunnel in order to minimize a length of the passenger boarding bridge as necessary. If the inner tunnel is moved into the outer tunnel, there is no sufficient space for installing an air-conditioning and heating apparatus at an upper part of the inner tunnel.

DISCLOSURE OF THE INVENTION

Problems to be Solved by the Invention

In view of the foregoing problems, the present disclosure provides an air-conditioning and heating apparatus for a passenger boarding bridge capable of sufficiently air-conditioning and heating the inside of the passenger boarding bridge.

Further, the present disclosure provides an air-conditioning and heating apparatus for a passenger boarding bridge capable of smoothly air-conditioning and heating the inside of the passenger boarding bridge even if the movable air-conditioning and heating the inside of the passenger boarding bridge is vertically or transversely rotated.

Furthermore, the present disclosure keeps air from being unnecessarily consumed and thus avoids unnecessary power consumption.

Moreover, the present disclosure minimizes a size of an air-conditioning and heating apparatus to be installed at an inner tunnel.

Besides, the present disclosure improves air-conditioning and heating efficiency by setting an air-conditioning and heating apparatus to be operated only for a necessary time according to flight information of airplanes.

Means for Solving the Problems

In accordance with a first example embodiment, a tunnel air-conditioning and heating apparatus may include: a condenser provided at a rotunda; a compressor provided at the rotunda and connected to the condenser; an evaporator provided at a movable tunnel and connected to each of the condenser and the compressor; and a condenser connection pipe configured to connect the condenser with the evaporator and a compressor connection pipe configured to the compressor with the evaporator each of which is formed into a flexible coil.

In accordance with a second example embodiment, An air-conditioning and heating system for a passenger boarding bridge may include: a tunnel air-conditioning and heating apparatus according to the tunnel air-conditioning and heating apparatus in accordance with the first example embodiment; and an extended tunnel air-conditioning and heating apparatus configured to air-condition and heat an extended tunnel extendably connected in a longitudinal direction of the movable tunnel to the opposite end of the movable tunnel to an end of the movable tunnel where the movable tunnel is connected with a rotunda.

In accordance with a third example embodiment, a passenger boarding bridge may include: a movable tunnel rotatably connected with a rotunda; and an extended tunnel connected with the opposite end of the movable tunnel to the end of the movable tunnel where the above-described movable tunnel is connected with the rotunda. The air-conditioning and heating system for a passenger boarding bridge in accordance with the second example embodiment can be applied to the extended tunnel and the movable tunnel.

In accordance with a fourth example embodiment, an air-conditioning and heating control system for a passenger boarding bridge may include: an air-conditioning and heating system for a passenger boarding bridge according to the air-conditioning and heating system for a passenger boarding bridge in accordance with the second example embodiment; a flight management server configured to store and update departure and arrival information of an airplane; and an air-conditioning and heating control unit for a passenger boarding bridge configured to receive the departure and arrival information from the flight management server and control the air-conditioning and heating system for a passenger boarding bridge.

Effect of the Invention

In accordance with the example embodiments, the connection pipe formed into a flexible coil is used to connect each of the condenser and the compressor with the evaporator, and the condenser and the compressor are installed to be movable along with transverse rotation of the movable tunnel. Thus, it is possible to smoothly air-condition and heat the inside of the tunnel.

Further, in the movable tunnel, the evaporator of the air-conditioning and heating apparatus is provided on the rotunda side and the condenser and the compressor are arranged at the upper part of the rotunda. Thus, it is possible to minimize a size of the air-conditioning and heating apparatus provided at the movable tunnel.

Furthermore, it is possible to avoid unnecessary power consumption by using the air-conditioning and heating system including the extended tunnel diffuser with the diffuser cover.

Moreover, it is possible to improve air-conditioning and heating efficiency and convenience in operating the air-conditioning and heating apparatus by setting the air-conditioning and heating apparatus to be automatically operated only for a predetermined time according to flight information of airplanes.

BRIEF DESCRIPTION OF THE DRAWINGS

FIG. 2 is a side view of the passenger boarding bridge to which the air-conditioning and heating system for a passenger boarding bridge in accordance with the example embodiment is applied.

FIG. 7 is a configuration view illustrating a method of controlling each air-conditioning and heating system for a passenger boarding bridge through an air-conditioning and heating system for a passenger boarding bridge in accordance with an example embodiment.

FIG. 8 illustrates an example of flight information of airplanes stored in a flight management server.

MODE FOR CARRYING OUT THE INVENTION

Figure 1:
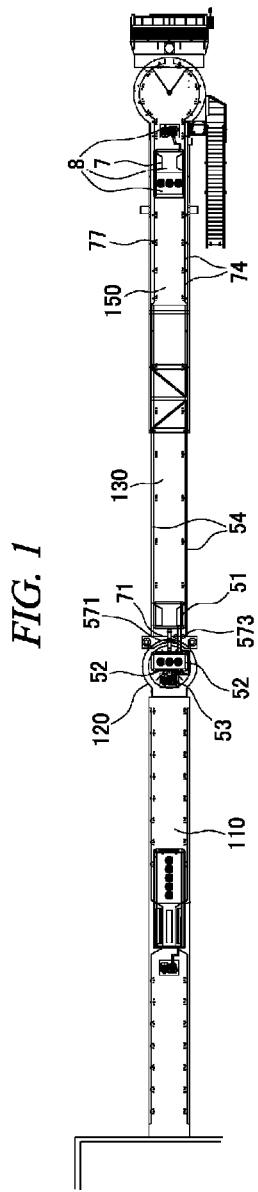
FIG. 1 is a plane view of a passenger boarding bridge to which an air-conditioning and heating system for a passenger boarding bridge in accordance with an example embodiment is applied.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element.

Through the whole document, the term "on" that is used to designate a position of one element with respect to another element includes both a case that the one element is adjacent to the another element and a case that any other element exists between these two elements.

Further, the term "comprises or includes" and/or "comprising or including" used in the document means that one or more other components, steps, operation and/or existence or addition of elements are not excluded in addition to the described components, steps, operation and/or elements unless context dictates otherwise. The term "about or approximately" or "substantially" is intended to have meanings close to numerical values or ranges specified with an allowable error and intended to prevent accurate or absolute numerical values disclosed for understanding of the present disclosure from being illegally or unfairly used by any unconscionable third party. Through the whole document, the term "step of" does not mean "step for".

Through the whole document, the term "combination of" included in Markush type description means mixture or combination of one or more components, steps, operations and/or elements selected from a group consisting of components, steps, operation and/or elements described in Markush type and thereby means that the disclosure includes one or more components, steps, operations and/or elements selected from the Markush group.

The present disclosure relates to a tunnel air-conditioning and heating apparatus for cooling and heating a movable tunnel connected with a rotunda, an air-conditioning and heating system for a passenger boarding bridge including the same, and a passenger boarding bridge.

A tunnel air-conditioning and heating apparatus (hereinafter, referred to as "the present tunnel air-conditioning and heating apparatus") in accordance with an example embodiment of the present disclosure will be explained first.

The present tunnel air-conditioning and heating apparatus includes a condenser 52.

The condenser 52 used in the present disclosure is one of those typically and is configured to condense and liquefy high-temperature and high-pressure coolant transferred from a compressor 53 to be described below. The condenser 52 used in the present disclosure may be provided at a rotunda 120. By way of example, referring to FIG. 1 or FIG. 2, the condenser 52 may be provided at an upper part of the rotunda 120, but may not be limited thereto.

The present tunnel air-conditioning and heating apparatus includes the compressor 53.

The compressor 53 used in the present disclosure is one of those typically and is configured to change low-pressure coolant to high-pressure coolant and transfer the high-pressure coolant to the condenser. Referring to FIG. 1 or FIG. 2, the compressor 53 may be provided at the rotunda 120 as being connected with the condenser 52.

The present tunnel air-conditioning and heating apparatus 5 includes an evaporator 51.

The evaporator 51 used in the present disclosure is one of those typically and is configured to absorb ambient heat and thus rapidly reduce an ambient temperature while receiving a liquid from the condenser 52 and generating a gas. Referring to FIG. 1 or FIG. 2, the evaporator 51 may be provided on a movable tunnel 130 to be adjacent to the rotunda 120.

The reason why the tunnel air-conditioning and heating apparatus is divided and installed at the rotunda 120 and the movable tunnel 130 is as follows. If a boarding gate of an airplane is not distant from a fixed tunnel 110, the total length of the passenger boarding bridge should be shortened. The length of the passenger boarding bridge is adjusted with an extended tunnel 150 to be described later. The extended tunnel 150 has wheels on its bottom and thus can move. Therefore, if the length of the passenger boarding bridge needs to be shortened, the extended tunnel 150 slides to accommodate the movable tunnel 130 therein.

Figure 5:
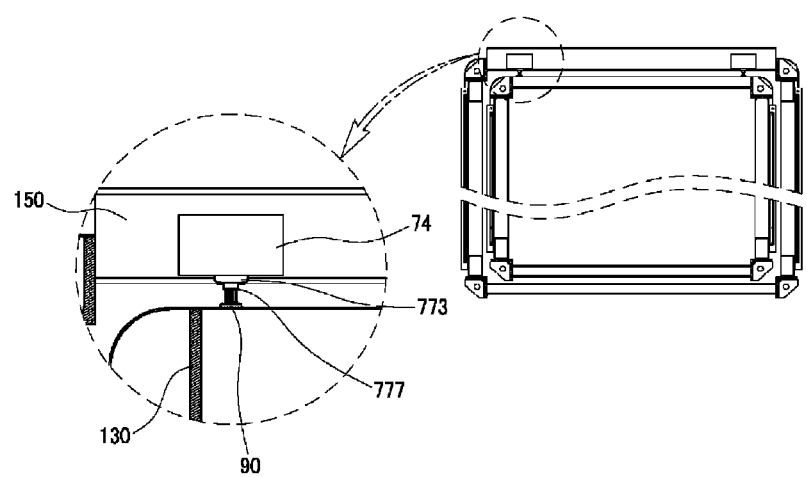
FIG. 5 is an enlarged cross-sectional view of an extended diffuser included in an extended tunnel and an opening/closing unit included in a movable tunnel to which an air-conditioning and heating system for a passenger boarding bridge in accordance with an example embodiment is applied.

In this case, a part of the movable tunnel 130 is positioned inside the extended tunnel 150 and another part thereof is positioned outside the extended tunnel 150. Referring to FIG. 5, at an upper part of the movable tunnel 130 positioned inside the extended tunnel 150, there is no space for installing an air-conditioning and heating apparatus. Further, if the height of the extended tunnel 150 is increased in order to make space for installing an air-conditioning and heating apparatus at the upper part of the movable tunnel 130, an inner space of the extended tunnel 150 is increased. Thus, an extended tunnel air-conditioning and heating apparatus 8 to be described later cannot sufficiently air-condition and heat the inside of the extended tunnel 150.

That is, only at an upper part of the movable tunnel 130 positioned outside the extended tunnel 150, space for installing an air-conditioning and heating apparatus is made. However, this space is also too narrow to install all of the evaporator 51, the condenser 52, and the compressor 53.

Therefore, the evaporator 51, the condenser 52, and the compressor 53 are divided and provided at the rotunda 120 and the movable tunnel 130. The evaporator 51 may be provided at the movable tunnel 130, and the compressor 53 and the condenser 52 may be provided at the rotunda.

The present tunnel air-conditioning and heating apparatus 5 includes a connection pipe unit 57.

The connection pipe unit 57 may include a condenser connection pipe 571 configured to connect the condenser 52 with the evaporator 51, and a compressor connection pipe 573 configured to connect the compressor 53 with the evaporator 51.

The condenser connection pipe 571 and the compressor connection pipe 573 may be formed in flexible coils.

Figure 4A:
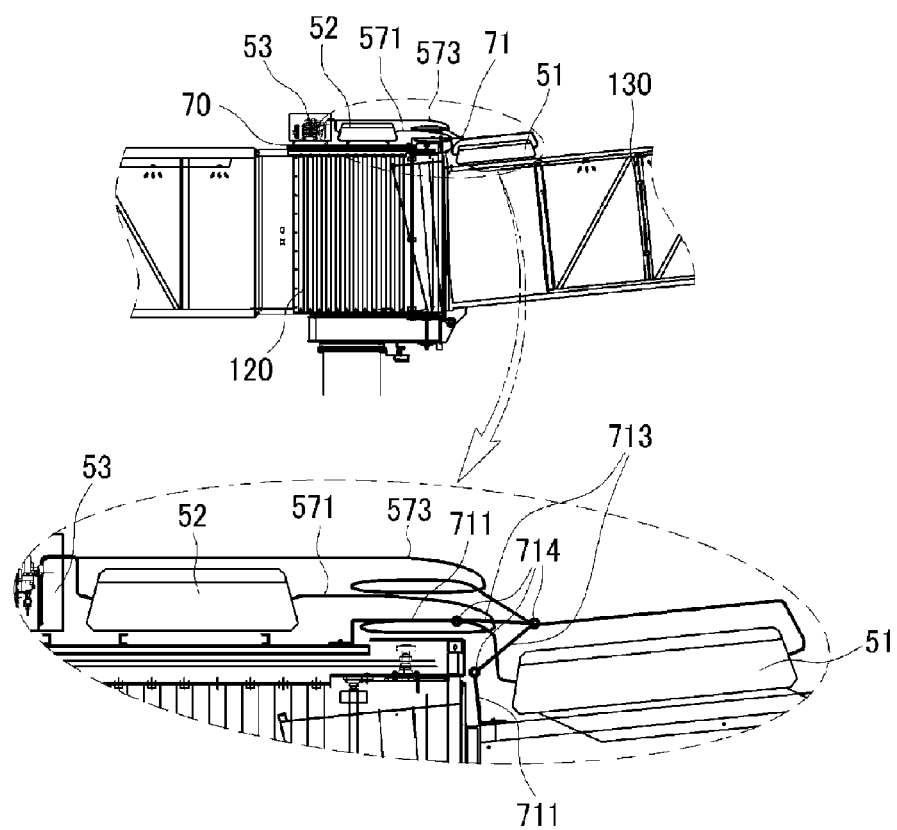
FIG. 4A and FIG. 4B are enlarged front views provided to explain an operation of a connection unit according to transverse rotation of a rotunda provided with a tunnel air-conditioning and heating apparatus in accordance with an example embodiment.
Figure 4B:
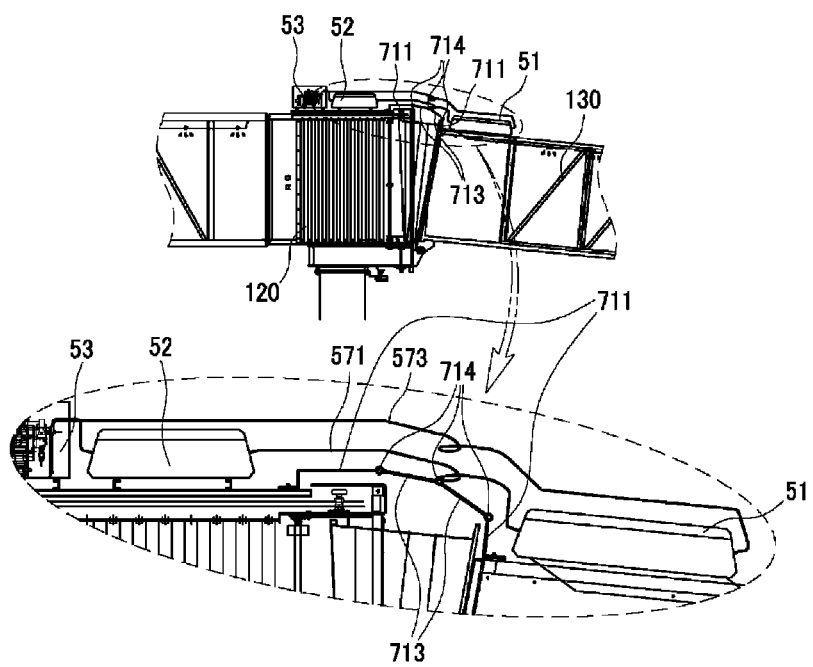

The movable tunnel 130 can be vertically rotated with respect to the rotunda 120 such that the movable tunnel 130 can be connected to an entrance of the airplane if the movable tunnel 130 is different in height from the airplane (see FIG. 4A and FIG. 4B). When the movable tunnel 130 is vertically rotated, the distance and height between the evaporator 51 and the compressor 53 and the distance and height between the evaporator 51 and the condenser 52 are changed. Thus, in order for the pipes to be maintained with respect to such variable distances and heights, desirably, the condenser connection pipe 571 and the compressor connection pipe 573 are formed into flexible pipes.

Figure 3A:
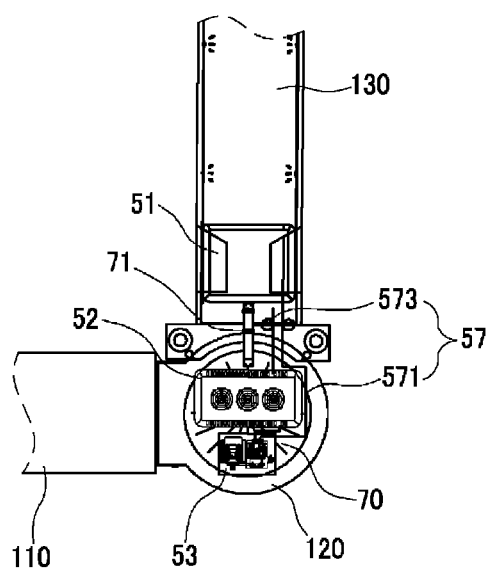
FIG. 3A and FIG. 3B are enlarged side views of a part of FIG. 2 to explain an operation of a turntable according to transverse rotation of a rotunda provided with a tunnel air-conditioning and heating apparatus in accordance with an example embodiment.
Figure 3B:
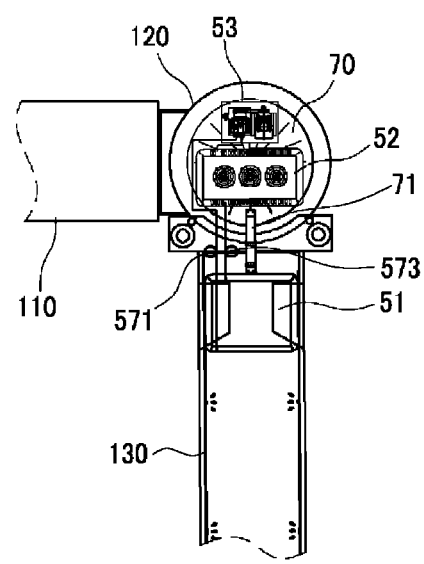

Further, by way of example, referring to FIG. 3 and FIG. 4, the condenser connection pipe 571 and the compressor connection pipe 573 are provided in the form of coils, and, thus, even if the distance and height of the movable tunnel 130 is changed, deformation caused by work hardening of the connection pipe unit 57 can be minimized. The coils may have, for example, a spring shape formed by rotating and winding the connection pipes (see FIG. 4A and FIG. 4B).

The present tunnel air-conditioning and heating apparatus 5 may include a turntable 70.

Typically, the turntable 70 is a table of which a lower part is fixed and an upper part is rotatable, and when a target object is provided at the upper part of the turntable 70, it can be rotated in a desired direction. By way of example, as depicted in FIG. 1 to FIG. 3, the turntable 70 may be provided on the rotunda 120.

The turntable 70 is provided to avoid damage to the connection pipe unit 57 included in the air-conditioning and heating apparatus caused by transverse rotation of the movable tunnel 130. Details thereof will be described later.

Further, the condenser 52 and the compressor 53 may be provided on the turntable 70.

The condenser 52 and the compressor 53 are provided at the upper part of the rotunda 120 and connected with the evaporator 51 provided at the upper part of the movable tunnel 130 via the respective pipes. Herein, the movable tunnel 130 is transversely rotated at a predetermined angle around the rotunda as a rotation axis in order to be connected to a gate of the airplane. The term "transverse rotation" means rotation around a rotation axis which is substantially perpendicular to the ground (see FIG. 3A and FIG. 3B). When the movable tunnel 130 is transversely rotated, the evaporator 51 is transversely rotated along with the movable tunnel 130. Since the condenser 52 and the compressor 53 are fixed at the upper part of the rotunda 120, they are not rotated along with rotation of the evaporator 51. If the movable tunnel 130 is largely rotated in a transverse manner, the pipes connected with the evaporator 51 may be damaged.

In order to avoid such damage, as depicted in FIG. 1 to FIG. 3, the turntable 70 is provided at the upper part of the rotunda 120 and the condenser 52 and the compressor 53 may be provided on the turntable 70. In this case, the condenser 52 and the compressor 53 can also be rotated along with the evaporator 51 as the movable tunnel 130 transversely moves, and can avoid damage to the pipes.

Further, the turntable 70 may include a rotation plate, and the condenser 52 and the compressor 53 may be provided on the rotation plate.

The turntable 70 may have various shapes, but desirably, the turntable 70 may have a fixed plate and a rotation plate, and may have a structure in which bearings are inserted between the two plates. The turntable 70 configured as such does not generate little frictional force during rotation. In this case, the fixed plate is firmly fixed at the upper part of the rotunda 120 in order not to be rotated, and firmly fixes the condenser 52 and the compressor 53 on the rotation plate and allows the condenser 52 and the compressor 53 to be transversely rotated along with the evaporator 51 as the rotunda 120 transversely moves.

Further, the turntable 70 may include a connection unit 71 connected with the upper part of the movable tunnel such that the rotation plate can be linked with transverse rotation of the connection 130.

As depicted in FIG. 3, the connection unit 71 is configured to allow the turntable 70 to be rotated at the same angle as the movable tunnel 130 when the movable tunnel 130 transversely rotates. That is, the connection unit 71 allows the evaporator 51 provided at the movable tunnel 130 to be rotated at the same angle as the condenser 52 and the compressor 53 provided at the rotunda 120 and thus avoids damage to the condenser connection pipe 571 and the compressor connection pipe 573.

If the opposite end of the movable tunnel 130 to an end of the movable tunnel 130 where the movable tunnel 130 is connected with the rotunda 120 is vertically rotated around an axis of the rotunda 120 as a rotation axis, the connection unit 71 may have a multilink structure to be able to make bending movement in a vertical direction.

As depicted in FIG. 4, the movable tunnel 130 is vertically rotated at a predetermined angle around the rotunda 120 as a rotation axis to be connected to the gate of the airplane. If the movable tunnel 130 is vertically rotated, the connection unit 71 may be deformed or damaged due to a load vertically applied thereto. In order to avoid this, referring to FIG. 4, the connection unit 71 may have a multilink structure to be able to make bending movement in a vertical direction.

Further, the connection unit 71 may be formed of connection links 711 respectively connected to the rotunda 120 and the movable tunnel 130, and a multilink structure which is connected to each of the connection links 711 and can be bent in a V-shape when the connection unit 71 makes bending movement in a vertical direction.

By way of example, the connection unit 71 includes the connection links 711 respectively connected to the rotunda 120 and the movable tunnel 130 as depicted in FIG. 4 and may include three hinges 714 and two links 713 between the connection links 711.

Referring to FIG. 4A, if the movable tunnel 130 is upwardly rotated, the connection unit 71 may be narrowed with respect to the centermost hinge 714 and thus its angle is decreased, and can be bent in a V-shape.

Further, referring to FIG. 4B, if the movable tunnel 130 is downwardly rotated, in the connection unit 71, the links 713 are widened with respect to the hinge 714 and thus the angle therebetween is increased, and can be unbent to be substantially straight.

Desirably, the connection unit 71 may secure the lengths of the links 713 such that the hinge 714 positioned in the middle can be above a virtual line connecting the hinges 714 provided at the two connection links 711 when the movable tunnel 130 is lowered to the lowermost position. This is because when the movable tunnel 130 at the lowermost position is upwardly rotated, the hinge 714 positioned in the middle is lowered and the links 713 may damage the movable tunnel 130.

The present tunnel air-conditioning and heating apparatus 5 may include a tunnel diffuser 55.

The tunnel diffuser 55 is configured to transfer air discharged from the evaporator 51 to the inside of the movable tunnel 130.

The tunnel diffuser 55 allows air discharged from the evaporator 51 and transferred through a tunnel duct 54 to be introduced into the movable tunnel 130. Desirably, as depicted in FIG. 1, the tunnel duct 54 may be provided at the left and right edges of the upper part of the movable tunnel 130. If the tunnel duct 54 is provided as depicted in FIG. 1, cooled and heated air is introduced from both sides, and, thus, air-conditioning and heating efficiency can be improved.

The tunnel diffuser 55 and the tunnel duct 54 may be provided with space between them. Desirably, referring to FIG. 1 and FIG. 2, the tunnel diffuser 55 may be provided with space corresponding to a distance in which air to be discharged can air-condition and heat with maximal efficiency.

Meanwhile, although not illustrated in the drawings, the present tunnel air-conditioning and heating apparatus may further include a heating apparatus.

By way of example, the heating apparatus may be a heating apparatus based on the heat pump principle. The heating apparatus based on the heat pump principle may be implemented with the condenser 52 and the evaporator 51 of which the positions are changed from those as described above. To be more specific, the evaporator 51 may be provided on the turntable 70, and the condenser 52 may be provided on the movable tunnel 130. In this case, a pipe connecting the condenser 52 with the evaporator 51 and a pipe connecting the condenser 52 with the compressor 53 may be provided in the form of flexible coils. Thus, it is possible to avoid damage to the pipes caused by rotation of the movable tunnel 130.

In another example, the heating apparatus may be electric heaters. Further, some of the electric heaters may be provided on the turntable 70 and the other may be divided and provided at the movable tunnel 130 and used as heating apparatuses depending on a size as necessary. By way of example, if the electric heaters are small in size and all of them can be provided at the movable tunnel, the electric heaters may be arranged to be adjacent to the evaporator 51. If the electric heaters are large in size, an apparatus configured to discharge air may be arranged to be adjacent to the condenser 52 or the compressor 53 on the turntable 70, and the other may be arranged to be adjacent to the evaporator 51 on the movable tunnel 130. The separate apparatuses can be connected to each other using connection pipes formed into flexible coils.

In still another example, the heating apparatus may be water heating apparatuses. The water heating apparatuses may be divided and arranged depending on size as necessary in the same manner as described above. By way of example, if the water heating apparatuses are large in size, an apparatus for heating hot water may be arranged to be adjacent to the condenser 52 or the compressor 53 on the turntable 70 and an apparatus for supplying hot water may be arranged to be adjacent to the evaporator 51 on the movable tunnel 130.

The separate apparatuses can be connected to each other using connection pipes formed into flexible coils.

An air-conditioning and heating system for a passenger boarding bridge (hereinafter, referred to as "present air-conditioning and heating system for a passenger boarding bridge") 40 in accordance with an example embodiment of the present disclosure will be explained. However, components identical or similar to those explained above in the tunnel air-conditioning and heating apparatus in accordance with one example embodiment will be assigned identical reference numerals, and explanation thereof will be briefly provided or omitted.

The present air-conditioning and heating system for a passenger boarding bridge 40 includes the present tunnel air-conditioning and heating apparatus.

As described above, the tunnel air-conditioning and heating apparatus is provided to air-condition and heat the movable tunnel 130.

The present air-conditioning and heating system for a passenger boarding bridge 40 includes an extended tunnel air-conditioning and heating apparatus.

The extended tunnel air-conditioning and heating apparatus is provided on the extended tunnel 150 to be close to the boarding gate of the airplane as depicted in FIG. 1 and FIG. 2. Unlike the movable tunnel 130, the extended tunnel air-conditioning and heating apparatus 150 is not limited in installation of an air-conditioning and heating apparatus. This is because only a part of the movable tunnel 130 is accommodated within the extended tunnel 150 when the total length of the passenger boarding bridge is adjusted. Therefore, if a part of the movable tunnel 130 is accommodated within the extended tunnel 150, at the upper part of the movable tunnel 130, sufficient space for installing an air-conditioning and heating apparatus cannot be obtained. On the other hand, the extended tunnel 150 is not accommodated within another tunnel, and, thus, at the upper part of the extended tunnel 150, there is sufficient space for installing an air-conditioning and heating apparatus.

Further, since there is provided the tunnel air-conditioning and heating apparatus from the rotunda 10 and the movable tunnel 130, the movable tunnel 130 and a part of the extended tunnel 150 connected to the movable tunnel 130 can be sufficiently air-conditioned and heated by the tunnel air-conditioning and heating apparatus. Therefore, as depicted in FIG. 2, it is desirable to provide the extended tunnel air-conditioning and heating apparatus to be as distant as possible. However, this is just an example, and the extended tunnel air-conditioning and heating apparatus is not necessarily installed to the position depicted in FIG. 2.

The extended tunnel air-conditioning and heating apparatus is configured to air-condition and heat the extended tunnel 150 extendably connected in a longitudinal direction of the movable tunnel 130 to the opposite end of the movable tunnel 130 to the end of the movable tunnel 130 where the movable tunnel 130 is connected with the rotunda 120.

The extended tunnel 150 may have a greater height than the movable tunnel 130 as depicted in FIG. 2, and has wheels on its bottom and thus can move. Therefore, when the boarding gate of the airplane is connected to the rotunda 120, it is possible to appropriately move and install the extended tunnel 150.

Further, the extended tunnel 150 can adjust a length of the passenger boarding bridge. The length of the passenger boarding bridge can be adjusted by sliding the extended tunnel 150 to accommodate a part of the movable tunnel 130 therein.

The extended tunnel air-conditioning and heating apparatus may include an extended tunnel diffuser 77.

The extended tunnel diffuser 77 is configured to transfer air discharged from the evaporator 7 of the extended tunnel air-conditioning and heating apparatus to the inside of the extended tunnel 150. The extended tunnel diffuser 77 is provided in an extended duct 74 connected to the evaporator included in the extended tunnel air-conditioning and heating apparatus.

The extended tunnel diffuser 77 may include a diffuser cover 771 configured to regulate inflow of air into the extended tunnel 150.

The diffuser cover 771 can regulate inflow of air from the extended tunnel diffuser 77 to the inside of the extended tunnel 150. That is, when air-conditioning and heating is needed, the diffuser cover 771 allows air to flow into the extended tunnel 150, but when air-conditioning and heating is not needed, the diffuser cover 771 blocks inflow of air.

Figure 6A:
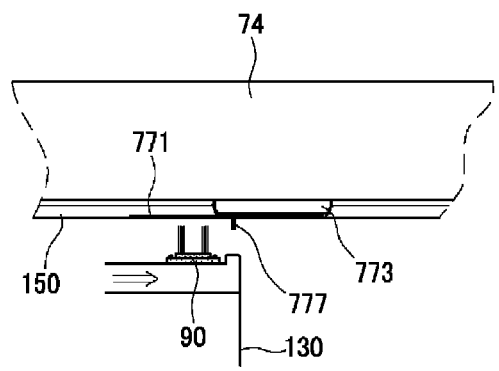
FIG. 6A and FIG. 6B are enlarged front views provided to explain an opening/closing method of a diffuser cover.
Figure 6B:
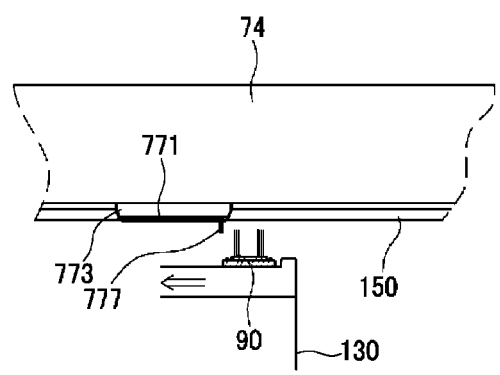

Referring to FIG. 5 and FIG. 6, the diffuser cover 771 may be provided at the extended duct 74.

The diffuser cover 771 may be moved to open and close an opening 775.

Further, the extended tunnel diffuser 77 is provided with the diffuser cover 771, and may include a cover attachment unit 773 in which the opening 775 allowing air to flow into the extended tunnel 150 is formed. Referring to FIG. 5 and FIG. 6, the diffuser cover 772 slides into the cover attachment unit 773 to open and close the opening 775.

The cover attachment unit 773 needs to fix a direction of the diffuser cover 771 in order for the diffuser cover 771 not to be changed in direction during sliding. Further, the cover attachment unit 773 needs to be formed such that the diffuser cover 771 can smoothly slide. By way of example, the cover attachment unit 773 may be formed into a rail.

The opening 775 formed in the cover attachment unit 773 may have an appropriate size to enable air transferred through the extended duct 74t to sufficiently air-condition and heat the inside of the extended tunnel 150.

Referring to FIG. 6, the diffuser cover 771 may be formed to be larger than at least the opening 775 such that the diffuser cover 771 can close the opening 775.

Further, the diffuser cover 771 may include a protrusion protruding toward the inside of the extended tunnel 150.

The protrusion 777 is brought into contact with an opening/closing unit 90 to be described below to aid sliding of the diffuser cover 771. As depicted in FIG. 5 and FIG. 6, desirably, the protrusion 777 protrudes from one end of the diffuser cover 771 where the opening is formed, but may not be limited thereto.

By way example, the protrusion 777 may downwardly protrude to an adequate length to move the diffuser cover 771.

The present air-conditioning and heating system for a passenger boarding bridge 40 may include the opening/closing unit 90.

The passenger boarding bridge is contracted by moving the extended tunnel 150 toward the outside of the movable tunnel 130, i.e. toward the rotunda 120. At this time, leakage of cooled and heated air to be discharged to the outside needs to be suppressed to save energy by closing the extended tunnel diffuser 77 at an overlapped portion between the movable tunnel 130 and the extended tunnel 150.

The opening/closing unit 90 is configured to push the protrusion 777 formed at the diffuser cover 771 and close the opening 775 in order to close the extended tunnel diffuser 77.

The opening/closing unit 90 may be aligned in the same line with the protrusion 777 and may protrude at an outer side of the movable tunnel 130. As depicted in FIG. 5 and FIG. 6, desirably, the opening/closing unit 90 may be aligned in the same line with the protrusion 777 such that the opening/closing unit 90 can be brought into contact with the protrusion 777 to slide the diffuser cover 771.

Further, as depicted in FIG. 6, desirably, the opening/closing unit 90 may be provided at the outer side of the movable tunnel 130 and may protrude at an outer upper part of the movable tunnel 130 such that the opening/closing unit 90 can be brought into contact with the protrusion 777.

Furthermore, if a part of the movable tunnel 130 is positioned inside the extended tunnel 150 according to sliding of the extended tunnel 150, one side of the protrusion 777 is brought into contact with the opening/closing unit 90, and, thus, the opening/closing unit 90 slides the diffuser cover 771 and closes the opening 775 to block inflow of air. That is, referring to FIG. 6A, the opening/closing unit 90 is positioned at an end of the movable tunnel, and if the opening/closing unit 90 is closer to the rotunda 120 than the protrusion 777, the opening 775 is opened. If the protrusion 777 is closer to the rotunda 120 than the opening/closing unit 90, the opening 775 may be closed.

Moreover, if the movable tunnel 130 is positioned outside the extended tunnel 150 according to sliding of the extended tunnel 15, the other side of the protrusion 777 is brought into contact with the opening/closing unit 90, and, thus, the opening/closing unit 90 slides the diffuser cover 771 and opens the opening 775 to allow inflow of air. That is, referring to FIG. 6B, if the protrusion 777 is closer to the rotunda 120 than the opening/closing unit 90, the opening 775 may be closed.

Further, the opening/closing unit 90 may have flexibility toward bending such that if the opening 775 is completely closed and sliding of the diffuser cover 771 is ended, the opening/closing unit 90 in contact with the protrusion 777 can be bent passing through the protrusion 777 and can continuously move toward a sliding direction of the diffuser cover 771.

Desirably, a material of the opening/closing unit 90 may have flexibility, and even if the opening/closing unit 90 reaches a position where the diffuser cover 771 is completely closed or a position where the diffuser cover 771 is completely opened, the opening/closing unit 90 is smoothly bent and continuously moves in its proceeding direction without being damaged as the extended tunnel 150 continuously slides. That is, the opening/closing unit 90 may be provided to continuously move in a direction opposite to a moving direction of the extended tunnel 150 when the diffuser cover 771 is closed or opened.

Desirably, the opening/closing unit 90 is provided with plastic brushes. The multiple brushes may be provided at regular distance to completely close or open the diffuser cover 771 when the diffuser cover 771 is not completely closed or opened.

Cooled and heated air discharged from the tunnel diffuser 55 or the extended tunnel diffuser 77 is used to air-condition and heat the inside of the movable tunnel 130 and the extended tunnel 150 and introduced into the evaporator through a waste air suction hole 511 for a tunnel or a waste air suction hole 72 for an extended tunnel.

By way of example, the waste air suction hole 511 for a tunnel or the waste air suction hole 72 for an extended tunnel may be provided at a central area of the evaporator 51 of the tunnel air-conditioning and heating apparatus or the evaporator of the extended tunnel air-conditioning and heating apparatus. The air introduced into the evaporator passes through a coil in the evaporator and gets out through the exit of the evaporator 7, and is transferred through the tunnel duct 54 or the extended duct 74 and discharged into the tunnel.

A passenger boarding bridge (hereinafter, referred to "present passenger boarding bridge) in accordance with an example embodiment of the present disclosure will be explained.

The present passenger boarding bridge includes the rotunda 120 and the movable tunnel 130 rotatably connected with the rotunda 120. The present passenger boarding bridge includes the extended tunnel 150 connected with the opposite end of the movable tunnel 130 to the end of the movable tunnel 130 where the movable tunnel 130 is connected with the rotunda 120. The extended tunnel 150 may slide such that a part of the movable tunnel 130 can be positioned within the extended tunnel 150.

Herein, the present air-conditioning and heating system for a passenger boarding bridge 40 can be applied to the movable tunnel 130 and the extended tunnel 150.

The tunnel air-conditioning and heating apparatus and the extended tunnel air-conditioning and heating apparatus of the air-conditioning and heating system for a passenger boarding bridge 40 applied to the present passenger boarding bridge may employ a large-scale (high-power) air-conditioning and heating apparatus as compared with conventional air-conditioning and heating apparatuses for a building.

In the present passenger boarding bridge, air-conditioning and heating apparatuses are divided and provided at the rotunda 120 and the movable tunnel 130. Thus, it is possible to employ larger-scale air-conditioning and heating apparatuses than conventional air-conditioning and heating apparatuses for a passenger boarding bridge. That is, the large-scale air-conditioning and heating apparatuses may be divided, and some of the apparatuses may be provided at the rotunda 120, and the other may be provided at the movable tunnel 130.

As described above, if the conventional air-conditioning and heating apparatuses for a passenger boarding bridge are divided and provided at the rotunda 120 and the movable tunnel 130, some air-conditioning and heating apparatuses provided at the rotunda 120 cannot be rotated along with rotation of the movable tunnel. Therefore, the pipes connecting the air-conditioning and heating apparatuses provided at the rotunda 120 and the movable tunnel 130 may be damaged by rotation of the movable tunnel 130.

However, in the air-conditioning and heating apparatuses for a passenger boarding bridge applied to the present passenger boarding bridge, the connection pipes are formed into flexible coils. Thus, the connection pipes do not have a risk of being damaged by rotation of the movable tunnel 130. Further, since the turntable 70 is provided at the rotunda 120, some air-conditioning and heating apparatuses provided at the rotunda 120 can be rotated along with rotation of the movable tunnel 130. Thus, there is no limitation in dividing and providing the large-scale air-conditioning and heating apparatuses.

By way of example, the above-described large-scale air-conditioning and heating apparatuses may employ air-conditioning and heating apparatuses used in a bus.

Conventionally, air-conditioning and heating apparatuses used for a movable tunnel employ air-conditioning and heating apparatuses for a building. The air-conditioning and heating apparatuses for a building are manufactured to be suitable for the small number of occupants. If they are applied to a long movable tunnel with the large number of occupants, sufficient air-conditioning and heating cannot be supplied due to a low flow rate.

A bus and the movable tunnel 130 are somewhat similar to each other in size of an inner space such as a width. An air-conditioning and heating apparatus used in such a bus can supply air-conditioning and heating with a sufficient flow rate in spite of the large number of occupants. Therefore, the air-conditioning and heating apparatus used in the bus can also be applied to the movable tunnel 130 having a similar inner space.

An air-conditioning and heating control system for a passenger boarding bridge (hereinafter, referred to as "present air-conditioning and heating control system for a passenger boarding bridge") in accordance with an example embodiment of the present disclosure will be explained.

The present air-conditioning and heating control system for a passenger boarding bridge includes the present air-conditioning and heating system for a passenger boarding bridge 50.

The present air-conditioning and heating system for a passenger boarding bridge 50 can be applied to a single passenger boarding bridge or each of multiple passenger boarding bridges.

The present air-conditioning and heating control system for a passenger boarding bridge includes a flight management server 10.

The flight management server 10 stores an arrival or departure schedule of airplanes, i.e. flight information of airplanes therein. Such flight information of airplanes is transmitted to and shared with an aeronautical telecommunication network (not illustrated).

Referring to FIG. 7, a schedule manager 100 inputs accurate flight information, which is changed in real time, into the flight management server 10 to update flight information of airplanes stored in the flight management server 10 in real time.

The flight management server 10 may transmit the flight information of airplanes to a display controller 20 or an air-conditioning and heating control unit for a passenger boarding bridge 30 to be described below.

The present air-conditioning and heating control system for a passenger boarding bridge includes the air-conditioning and heating control unit for a passenger boarding bridge 30.

The air-conditioning and heating control unit for a passenger boarding bridge 30 may operate the tunnel air-conditioning and heating apparatus and the extended tunnel air-conditioning and heating apparatus before a preset time earlier than a departure time according to departure information of an airplane to be connected to the passenger boarding bridge or an arrival time according to arrival information.

The present air-conditioning and heating control system for a passenger boarding bridge may operate the tunnel air-conditioning and heating apparatus and the extended tunnel air-conditioning and heating apparatus in advance only for a necessary time in use instead of operating the tunnel air-conditioning and heating apparatus and the extended tunnel air-conditioning and heating apparatus all the time. Generally, a passenger boarding bridge is used before a departure time of an airplane or after an arrival time of an airplane. Thus, the tunnel air-conditioning and heating apparatus and the extended tunnel air-conditioning and heating apparatus may be operated only for this time period.

Therefore, the air-conditioning and heating control unit for a passenger boarding bridge 30 previously sets a time for operating the tunnel air-conditioning and heating apparatus and the extended tunnel air-conditioning and heating apparatus within certain hours of a departure time or arrival time of an airplane, and controls the tunnel air-conditioning and heating apparatus and the extended tunnel air-conditioning and heating apparatus to be operated at the preset time.

By way of example, the preset time can be determined by obtaining an average value of times for reaching a temperature adequate for an operation time of the tunnel air-conditioning and heating apparatus and the extended tunnel air-conditioning and heating apparatus set depending on a length of the passenger boarding bridge, a capacity of the tunnel air-conditioning and heating apparatus and the extended tunnel air-conditioning and heating apparatus, and an external air temperature, and calculating a time adequate for operating the apparatuses at each external air temperature.

Referring to FIG. 7, the air-conditioning and heating control unit for a passenger boarding bridge 30 may receive flight information of the airplane to be connected to the passenger boarding bridge from the display controller 20 or the flight management server 10.

By way of example, the air-conditioning and heating control unit for a passenger boarding bridge 30 may receive a departure time or arrival time of the airplane to be connected to the passenger boarding bridge from the flight management server 10 and control each air-conditioning and heating system for a passenger boarding bridge 40 to operate the tunnel air-conditioning and heating apparatus and the extended tunnel air-conditioning and heating apparatus at a preset time.

Otherwise, the air-conditioning and heating control unit for a passenger boarding bridge 30 may receive a departure time or arrival time of the airplane to be connected to the passenger boarding bridge from the display controller 20 to be described below and control each air-conditioning and heating system for a passenger boarding bridge 40 to operate the tunnel air-conditioning and heating apparatus and the extended tunnel air-conditioning and heating apparatus at a preset time.

After a passenger handling process with respect to the airplane to be connected to the passenger boarding bridge is ended, the air-conditioning and heating control unit for a passenger boarding bridge 30 may detect an ending signal from the passenger boarding bridge and stop operating the tunnel air-conditioning and heating apparatus and the extended tunnel air-conditioning and heating apparatus.

By way of example, as depicted in FIG. 7, the ending signal is transmitted by a passenger boarding bridge manager 300 to the air-conditioning and heating control unit for a passenger boarding bridge 30 and controls the air-conditioning and heating system for a passenger boarding bridge 40. The passenger boarding bridge manager 300 can monitor and control an operation of a passenger boarding bridge and can also monitor and control a tunnel air-conditioning and heating apparatus and an extended tunnel air-conditioning and heating apparatus included in each air-conditioning and heating system for a passenger boarding bridge at the same time.

Otherwise, as depicted in FIG. 7, the ending signal is transmitted by the display controller 20 to be described below to the air-conditioning and heating control unit for a passenger boarding bridge 30 and controls the air-conditioning and heating system for a passenger boarding bridge 40.

Further, the air-conditioning and heating control unit for a passenger boarding bridge 30 may stop operating the tunnel air-conditioning and heating apparatus and the extended tunnel air-conditioning and heating apparatus after a preset time earlier than a departure time according to departure information of an airplane to be connected to the passenger boarding bridge or an arrival time according to arrival information.

Although a passenger handling process varies depending on a size of an airplane, desirably, it is possible to stop operating a tunnel air-conditioning and heating apparatus and an extended tunnel air-conditioning and heating apparatus 10 to 15 minutes after a passenger boarding bridge is completely connected to an airplane.

Further, the operation of the tunnel air-conditioning and heating apparatus and the extended tunnel air-conditioning and heating apparatus may be manually stopped by the passenger boarding bridge manager 300, or may be automatically stopped in response to an operation stop signal after passengers completely board the airplane and the passenger boarding bridge is disconnected from the airplane.

Further, the air-conditioning and heating control unit for a passenger boarding bridge 30 may receive departure and arrival information from the flight management server 10 through the display controller 20 and control the air-conditioning and heating system for a passenger boarding bridge 40.

The display controller 20 receives flight information of airplanes from the flight management server 10 and displays the information to be shown in various designs suitable for type or location.

By way of example, the display controller 20 can control a FIDS as depicted in FIG. 7. The FIDS is configured to display information overall showing departure or arrival of airplanes.

Further, the display controller 20 can control a GIDS as depicted in FIG. 7. The GIDS is configured to display information showing gates for departure or arrival of airplanes.

Referring to FIG. 7, the display controller 20 receives information about departure time or arrival time of an airplane from the flight management server 10 and shows flight information of the airplane, and also transmits the information about departure time or arrival time of the airplane to the air-conditioning and heating control unit for a passenger boarding bridge 30 to control the air-conditioning and heating system for a passenger boarding bridge 40.

The above description of the present disclosure is provided for the purpose of illustration, and it would be understood by those skilled in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

We claim:

1. An air-conditioning and heating system for a passenger boarding bridge comprising:
a tunnel air-conditioning and heating apparatus for air-conditioning and heating a movable tunnel connected to a rotunda;
an extended tunnel air-conditioning and heating apparatus configured to air-condition and heat an extended tunnel extendably connected in a longitudinal direction of the movable tunnel from an end of the movable tunnel;
a tunnel diffuser provided at a tunnel duct of the movable tunnel and configured to allow air discharged from an evaporator of the tunnel air-conditioning and heating apparatus to flow into the movable tunnel through the tunnel duct; and
an extended tunnel diffuser provided at an extended tunnel duct of the extended tunnel and configured to allow air discharged from an evaporator of the extended tunnel air-conditioning and heating apparatus to flow into the extended tunnel through the extended tunnel duct,
wherein an opposite end of the movable tunnel is connected with the rotunda,
wherein the tunnel air-conditioning and heating apparatus comprises:
a condenser provided at the rotunda;
a compressor connected with the condenser and provided at the rotunda;
an evaporator provided at the movable tunnel and connected to each of the condenser and the compressor;
connection pipes configured to connect the evaporator with the condenser and the compressor, respectively; and
a turntable configured to be transversely rotatable at an upper part of the rotunda,
wherein the condenser and the compressor are provided on the turntable, and the connection pipes include a condenser connection pipe configured to connect the condenser with the evaporator and a compressor connection pipe configured to connect the compressor with the evaporator, and
wherein the extended tunnel diffuser comprises:
a diffuser cover configured to regulate inflow of the air into the extended tunnel; and
a cover mounting unit to which the diffuser cover is mounted and in which an opening allowing the air to flow into the extended tunnel is formed.

2. The air-conditioning and heating system for a passenger boarding bridge of claim 1,
wherein the condenser connection pipe and the compressor connection pipe are formed into flexible coils.

3. The air-conditioning and heating system for a passenger boarding bridge of claim 1,
wherein the turntable includes:
a rotation plate on which the condenser and the compressor are provided; and
a connection unit configured to connect the rotation plate with the upper part of the movable tunnel in order for the rotation plate to be rotated along with transverse rotation of the movable tunnel.

4. The air-conditioning and heating system for a passenger boarding bridge of claim 3,
wherein the connection unit has a multilink structure to be able to make bending movement in a vertical direction when the opposite end of the movable tunnel to an end of the movable tunnel where the movable tunnel is connected with the rotunda is vertically rotated around an axis of the rotunda as a rotation axis.

5. The air-conditioning and heating system for a passenger boarding bridge of claim 4,
wherein the connection unit is formed of connection links respectively connected to the rotunda and the movable tunnel, and a multilink structure which is connected to each of the connection links and is bent in a V-shape when the movable tunnel makes bending movement in a vertical direction.

6. The air-conditioning and heating system for a passenger boarding bridge of claim 1,
wherein the evaporator is provided on the movable tunnel to be adjacent to the rotunda.

7. The air-conditioning and heating system for a passenger boarding bridge of claim 1,
wherein the diffuser cover slides into the cover mounting unit to open the opening and slides out the cover mounting unit to close the opening.

8. The air-conditioning and heating system for a passenger boarding bridge of claim 7,
wherein the diffuser cover includes a protrusion protruding toward the inside of the extended tunnel.

9. The air-conditioning and heating system for a passenger boarding bridge of claim 8, further comprising:
an opening/closing unit which is aligned in the same line with an end of the protrusion and protrudes at an outer side of the movable tunnel.

10. The air-conditioning and heating system for a passenger boarding bridge of claim 9,
wherein in the opening/closing unit, if a part of the movable tunnel is positioned inside the extended tunnel according to sliding of the extended tunnel, one side of the protrusion is brought into contact with the opening/closing unit, and, thus, the opening/closing unit slides the diffuser cover and closes the opening to block inflow of the air, and if the movable tunnel is positioned outside the extended tunnel according to sliding of the extended tunnel, the other side of the protrusion is brought into contact with the opening/closing unit, and, thus, the opening/closing unit slides the diffuser cover and opens the opening to allow inflow of the air.

11. The air-conditioning and heating system for a passenger boarding bridge of claim 10,
wherein in the opening/closing unit, if the extended tunnel slides in a direction to be close to the rotunda, the opening is closed, and the extended tunnel slides in a direction to be distant from the rotunda, the opening is opened.

12. The air-conditioning and heating system for a passenger boarding bridge of claim 9,
wherein the opening/closing unit has flexibility toward bending that enables the opening/closing unit in contact with the protrusion to be bent passing through the protrusion and continuously move toward a sliding direction of the diffuser cover when the opening is completely closed and sliding of the diffuser cover is ended.

13. The air-conditioning and heating system for a passenger boarding bridge of claim 1, further comprising:
a waste air suction hole for the movable tunnel configured to collect air discharged into the movable tunnel to be transferred to the tunnel air-conditioning and heating apparatus.

14. The air-conditioning and heating system for a passenger boarding bridge of claim 1, further comprising:
a waste air suction hole for an extended tunnel configured to collect air discharged into the extended tunnel to be transferred to the extended tunnel air-conditioning and heating apparatus.

15. A passenger boarding bridge comprising:
a rotunda;
a movable tunnel rotatably connected with the rotunda;
an extended tunnel extendably connected in a longitudinal direction of the movable tunnel from an end of the movable tunnel;
a tunnel air-conditioning and heating apparatus for air-conditioning and heating the movable tunnel;
an extended tunnel air-conditioning and heating apparatus configured to air-condition and heat the extended tunnel and provided on the extended tunnel,
a tunnel diffuser provided at a tunnel duct of the movable tunnel and configured to allow air discharged from an evaporator of the tunnel air-conditioning and heating apparatus to flow into the movable tunnel through the tunnel duct; and
an extended tunnel diffuser provided at an extended tunnel duct of the extended tunnel and configured to allow air discharged from an evaporator of the extended tunnel air-conditioning and heating apparatus to flow into the extended tunnel through the extended tunnel duct,
wherein an opposite end the movable tunnel is connected with the rotunda,
wherein the extended tunnel is slidable to accommodate a part of the movable tunnel within the extended tunnel,
wherein the tunnel air-conditioning and heating apparatus comprises:
a condenser provided at the rotunda;
a compressor connected with the condenser and provided at the rotunda;
an evaporator provided at the movable tunnel and connected to each of the condenser and the compressor;
connection pipes configured to connect the evaporator with the condenser and the compressor, respectively; and
a turntable configured to be transversely rotatable at an upper part of the rotunda, and
wherein the condenser and the compressor are provided on the turntable, and the connection pipes include a condenser connection pipe configured to connect the condenser with the evaporator and a compressor connection pipe configured to connect the compressor with the evaporator, and
wherein the extended tunnel diffuser comprises:
a diffuser cover configured to regulate inflow of the air into the extended tunnel; and
a cover mounting unit to which the diffuser cover is mounted and in which an opening allowing the air to flow into the extended tunnel is formed.

16. An air-conditioning and heating control system for a passenger boarding bridge comprising:
an air-conditioning and heating system for a passenger boarding bridge;
a flight management server configured to store and update departure and arrival information of an airplane; and
a controller for a passenger boarding bridge configured to receive the departure and arrival information from the flight management server and control the air-conditioning and heating system for a passenger boarding bridge,
wherein the air-conditioning and heating system for a passenger boarding bridge comprises:
a tunnel air-conditioning and heating apparatus for air-conditioning and heating a movable tunnel connected to a rotunda;
an extended tunnel air-conditioning and heating apparatus configured to air-condition and heat an extended tunnel extendably connected in a longitudinal direction of the movable tunnel from an end of the movable tunnel, a tunnel diffuser provided at a tunnel duct of the movable tunnel and configured to allow air discharged from an evaporator of the tunnel air-conditioning and heating apparatus to flow into the movable tunnel through the tunnel duct; and an extended tunnel diffuser provided at an extended tunnel duct of the extended tunnel and configured to allow air discharged from an evaporator of the extended tunnel air-conditioning and heating apparatus to flow into the extended tunnel through the extended tunnel duct, wherein an opposite end of the movable tunnel is connected with the rotunda, wherein the tunnel air-conditioning and heating apparatus comprises:

a condenser provided at the rotunda;

a compressor connected with the condenser and provided at the rotunda;

an evaporator provided at the movable tunnel and connected to each of the condenser and the compressor;

connection pipes configured to connect the evaporator with the condenser and the compressor, respectively; and a turntable configured to be transversely rotatable at an upper part of the rotunda, and wherein the condenser and the compressor are provided on the turntable, and the connection pipes include a condenser connection pipe configured to connect the condenser with the evaporator and a compressor connection pipe configured to connect the compressor with the evaporator, and wherein the extended tunnel diffuser comprises:

a diffuser cover configured to regulate inflow of the air into the extended tunnel; and a cover mounting unit to which the diffuser cover is mounted and in which an opening allowing the air to flow into the extended tunnel is formed.

17. The air-conditioning and heating control system for a passenger boarding bridge of claim 16, wherein the controller for a passenger boarding bridge operates the tunnel air-conditioning and heating apparatus and the extended tunnel air-conditioning and heating apparatus before respective preset times earlier than a departure time according to the departure information of an airplane to be connected to a passenger boarding bridge or an arrival time according to the arrival information.

18. The air-conditioning and heating control system for a passenger boarding bridge of claim 16, wherein the controller for a passenger boarding bridge detects an ending signal from the passenger boarding bridge and stops operating the tunnel air-conditioning and heating apparatus and the extended tunnel air-conditioning and heating apparatus after a passenger handling process with respect to an airplane to be connected to a passenger boarding bridge is ended.

19. The air-conditioning and heating control system for a passenger boarding bridge of claim 16, wherein the controller for a passenger boarding bridge stops operating the tunnel air-conditioning and heating apparatus and the extended tunnel air-conditioning and heating apparatus after respective preset times earlier than a departure time according to the departure information of an airplane to be connected to a passenger boarding bridge or an arrival time according to the arrival information.

20. The air-conditioning and heating control system for a passenger boarding bridge of claim 16, wherein the controller for a passenger boarding bridge receives the departure and arrival information from the flight management server through a display controller and controls the air-conditioning and heating system for a passenger boarding bridge.

21. The air-conditioning and heating control system for a passenger boarding bridge of claim 16, wherein the air-conditioning and heating system for a passenger boarding bridge is applied to a single passenger boarding bridge or each of multiple passenger boarding bridges.

* * * * *